March 16, 1948.　　　J. M. CHAMBERS ET AL　　　2,437,875
AUTOMATIC DEPTH CONTROL FOR GROUND-WORKING IMPLEMENTS
Filed Jan. 10, 1945　　　4 Sheets-Sheet 2
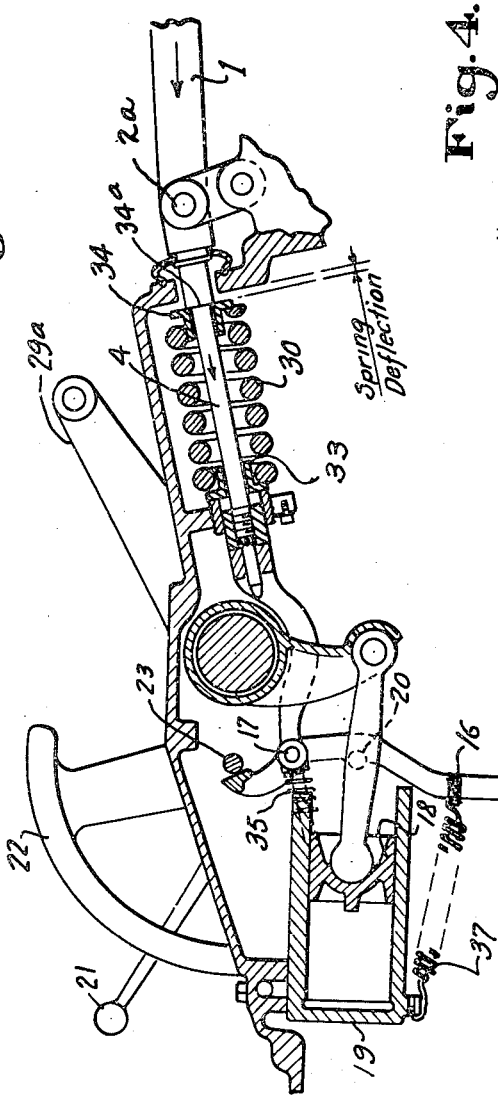
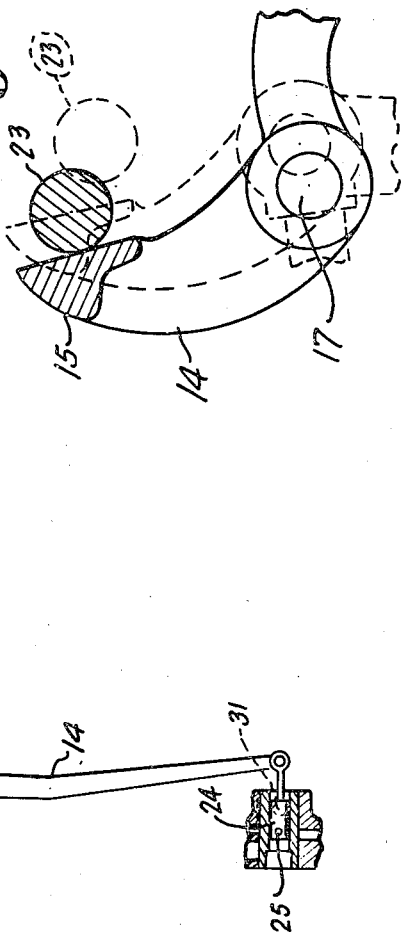
INVENTORS
John M. Chambers
Ernest V. Bunting
BY
Barnes, Kisselle, Laughlin & Raisch
Attorneys

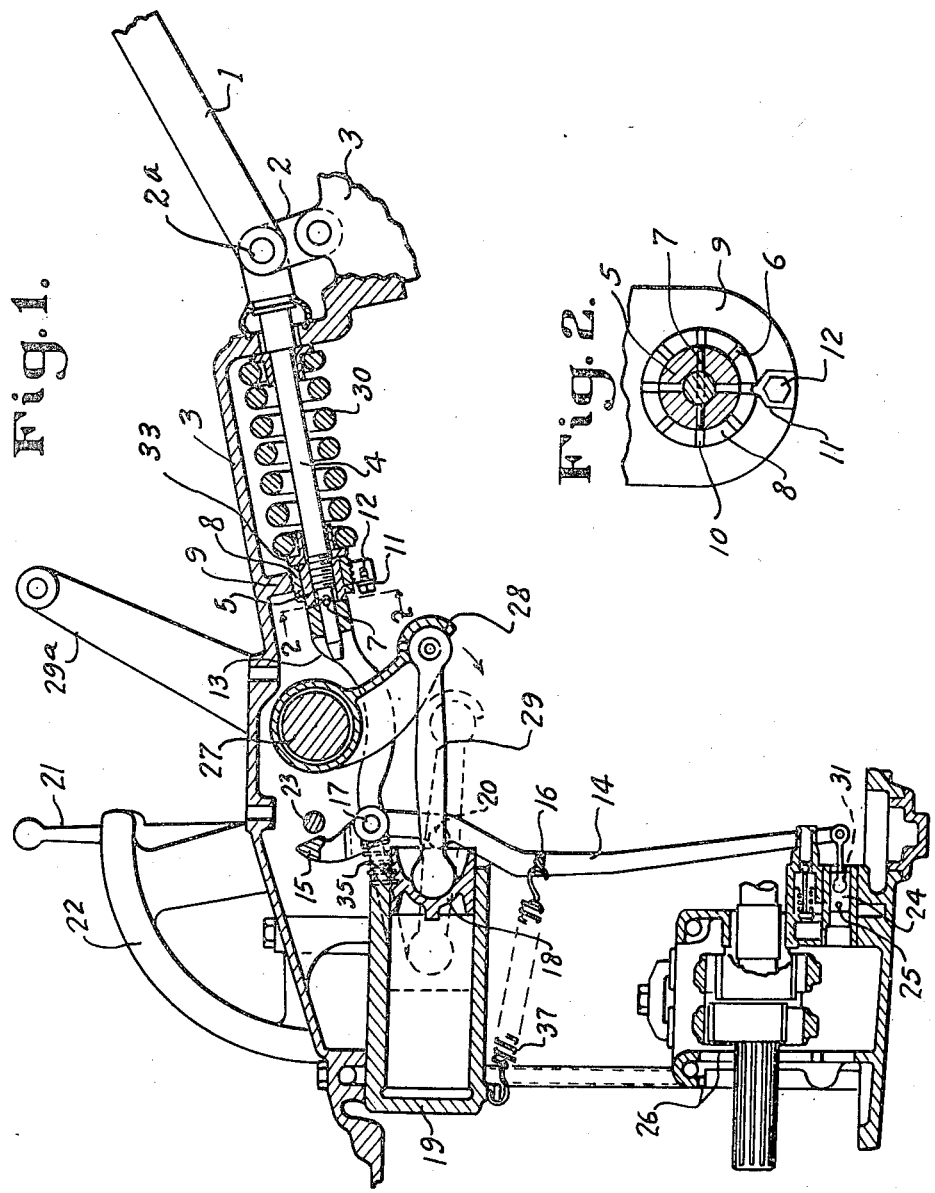

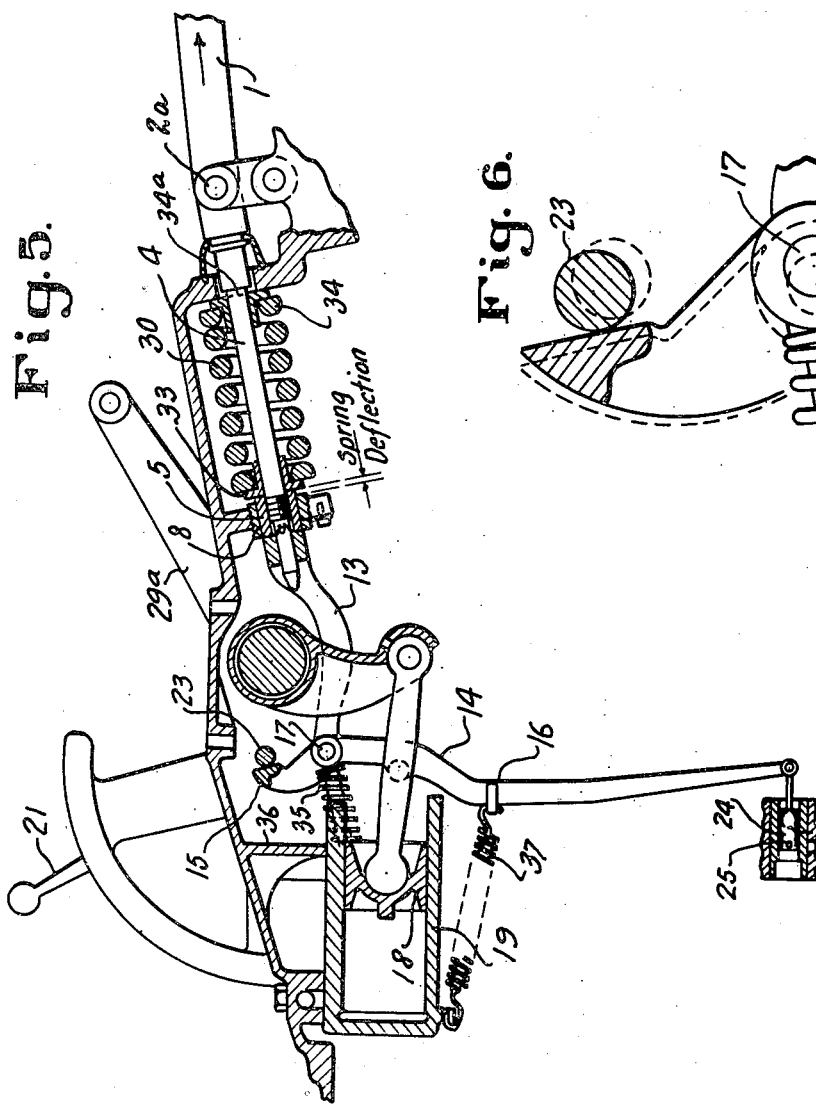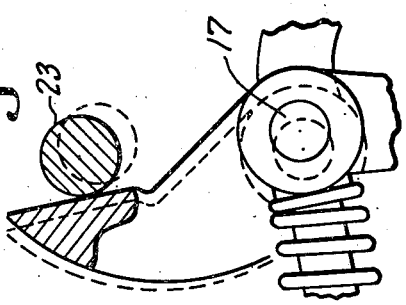

March 16, 1948. J. M. CHAMBERS ET AL 2,437,875
AUTOMATIC DEPTH CONTROL FOR GROUND-WORKING IMPLEMENTS
Filed Jan. 10, 1945 4 Sheets-Sheet 4
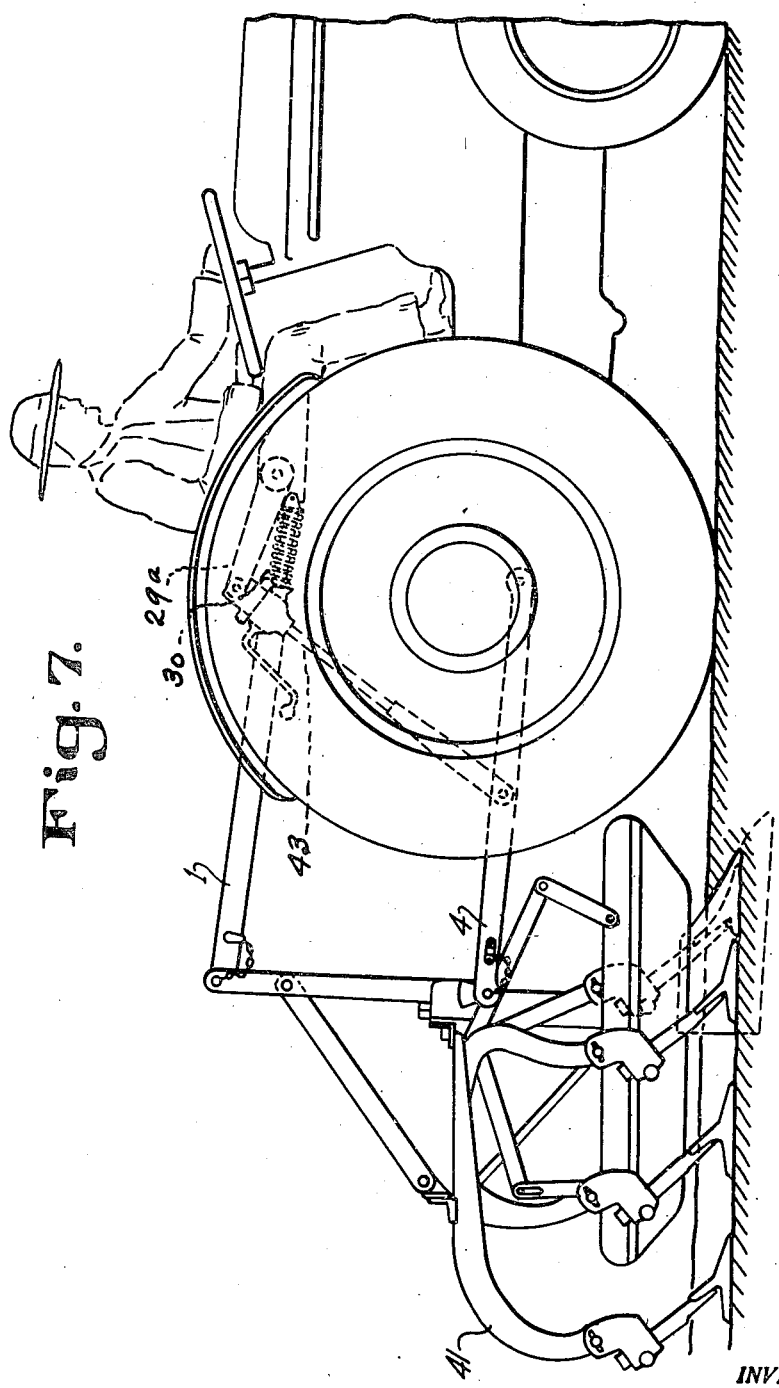
INVENTOR.
John M. Chambers
Ernest V. Bunting
BY
Barnes, Kisselle, Laughlin & Raisch
ATTORNEY'S Patented Mar. 16, 1948

2,437,875

UNITED STATES PATENT OFFICE 2,437,875

AUTOMATIC DEPTH CONTROL FOR GROUNDWORKING IMPLEMENTS

John M. Chambers and Ernest V. Bunting, Dearborn, Mich., assignors to Harry Ferguson, Inc., Dearborn, Mich., a corporation of Delaware Application January 10, 1945, Serial No. 572,158

10 Claims. (Cl. 97—50)

This invention relates to automatic depth controls for ground working implements and more particularly to controls of the character disclosed and claimed in the patent to Ferguson No. 2,118,180, issued May 24, 1938.

In such a control system the depth of a groundworking implement in the soil is controlled by the draft of the implement and a constant depth is maintained by a control system which responds to an increase or decrease in draft to make a corresponding and approriate adjustment in the position of the implement. In the system as disclosed in said Ferguson patent an implement is mounted on a tractor by means of a pair of lower, horizontally spaced, rearwardly extending links and by an upper, rearwardly extending top link. These elements may be considered a hitch in which, when the structure shown in the patent is in operation, the lower links are in tension and the upper link is in compression. Operating in conjunction with these links, is a control system which employs hydraulically actuated means as a source of power and is arranged to respond to variations from a predetermined value of the compression load on the upper link to effect a movement of the implement accordingly to the depth determined by such value.

Such a system while effective in its response to variations in the compression load will not control implement depth when the draft or horizontal resistance of the implement is so light as to produce no compressive load. Thus, when the implement mounted on the links, overhangs or extends rearwardly beyond the ends of the links, the upper link will be under tension until the draft or horizontal resistance on the implement in the soil equals or exceeds the effect of its overhanging weight. In implements that are intended to work relatively deep in the soil, such as plows, there is ample compression force for actuating the system, but with such implements as cultivators, planters and the like, or where the plow is to turn a shallow furrow or in any case where the draft or horizontal resistance will not overcome the effect of the overhanging implement weight, a compression force will not be produced for controlling the system shown in said patent.

An object of the invention is to provide new and improved means for enabling the control system to maintain a constant relationship of an implement to the soil in response to any variation of the draft or horizontal resistance of the implement.

Another object of the present invention is to provide a new and improved control system having means adapted to adjust the operative relationship of an implement to the soil and control means therefor which is responsive to variations in implement draft to effect such adjustment and includes a single means yieldingly opposing any force exerted thereon by the implement through the hitch and enabling the control means to respond to variations in any such force.

In conjunction with the foregoing another object is to provide a system in which the yielding means is a spring having a central neutral position in which the spring is substantially unloaded.

In the drawings:

Fig. 1 is a sectional view of the improved automatic depth control. The parts are in the position they assume when the hitch is elevated with no load on the upper hitch link and with the control spring in its neutral unloaded position.

Fig. 2 is a section on the line 2—2 of Fig. 1.

Fig. 3 is a view similar to Fig. 1 showing the hitch lowered and the implement working with considerable draft load so that the control spring is resisting the compression forces in the upper link.

Fig. 4 is an enlarged view showing in full lines the valve control lever and eccentric pin controlled by the hand lever in the position shown in Fig. 3. The dotted lines show the control lever and eccentric pin when the parts are in the position shown in Fig. 1.

Fig. 5 is a view similar to Fig. 3 showing, however, the relationship of parts assumed when the implement is under a light draft load so that the control spring is resisting the forces in tension in the upper link.

Fig. 6 is an enlarged view of the lever and the eccentric pin controlled by the hand lever. This view shows in full lines the position of these parts in Fig. 5, and for comparison, in dotted lines the positions of the same parts in Fig. 1.

Fig. 7 is a view of a tractor provided with a hitch and overhanging implement, to-wit: a cultivator.

In the hydraulic depth control which is described in the Ferguson Patent No. 2,118,180, the control rod is arranged to be movable endwise in response to forces exerted thereon by the implement through the upper link of the hitch. Such movement is yieldingly opposed or resisted by a control spring. The control rod acts on a lever which is operatively connected with a valve arranged to control the flow of pressure fluid to and from a piston and cylinder motor. The motor in turn controls the vertical movement of the lower li..s of the hitch. Accordingly, an implement mounted on the hitch may be raised or lowered or held in an intermediate position through the operation of the control system in response to the forces exerted by the implement. A manually operable lever is arranged to act on the valve control lever to enable an operator to raise and lower the implement at will. The manual lever is also effective to shift the position of a fulcrum of the valve control lever to set the valve controlling means for response to a predetermined implement force whereby to determine the depth of cut of the implement.

An implement which when mounted and supported on the hitch overhangs to the rear of the links will tend to rotate about the pivotal connection between the implement and the lower links. In such a condition, the upper link will be under tension, but when the horizontal resistance exerted against the implement by the soil is sufficient to overcome the overhanging weight of the implement, the upper link will be under compression. In the system shown in the Ferguson patent aforesaid, the control spring is arranged to resist only compressive forces in the upper link. The present invention aims to increase materially the effective range through which the control system will operate by making the system operable to control the depth of the implement in the soil in response to all variations of the forces (whether compression or tension) resulting from implement operation. In the particular embodiment of the invention, which will hereinafter be described, the control spring is arranged to be placed under load by movement of the upper link in either endwise direction, the spring having a central neutral position in which it is substantially unloaded whereby the full extent of spring deflection may be employed to resist the forces applied thereto.

Referring to Fig. 1, 1 is the upper link pivoted by a pin 2a to a shackle 2 which is pivoted to the top of the transmission housing 3. A control rod 4 also pivoted on pin 2a extends forwardly from this shackle into the housing. The forward end of this rod has an adjustable sleeve 5 screwed thereon. This sleeve is provided with grooves 6 at the quarter points so that when it has been screwed onto the end of the control rod it may be locked in a given quarter position by the pin 7 inserted through the control rod. This sleeve is slidably guided in an externally threaded cylinder 8 which screws into the partition wall 9 of the transmission housing. This cylinder 8 is provided with notches 10 to receive the nub of a locking plate 11 held on the partition wall 9 by bolt 12. Hence, the cylinder may be locked in any given position of adjustment relative to the partition.

The end of the control rod fits snugly but freely in a bore appropriately provided in the base of a yoke 13 which connects the inner or forward end of the control rod with a valve operating lever 14. The valve lever is preferably a frame comprised of two upright transversely spaced members (only one is shown here in the drawings) connected by a cross bar or plate 15 at the top and an intermediate cross bar 16. The spaced arms of the yoke are pivoted, as at 17, to the uprights of the lever frame.

The hand lever 21 can be positioned along the quadrant 22 to determine the working depth of the implement. This hand lever 21 sets the position of the eccentric pin 23, and the position of this pin, which becomes a fulcrum point for lever 14, determines the working depth of the implement. The slide valve 24 is arranged to control the intake port 31 and the discharge port 25. Intake port 31 connects the oil reservoir with the suction side of the pump 26. When the intake port is uncovered, oil is pumped into the cylinder 19 to cause the piston to move in an outwardly direction. The upward limit of the rise of the hitch is reached when the piston 18 strikes the lugs 20 on the valve control arm 14 to throw the valve back to the neutral position in which both valve ports are covered. This stops further lifting of the hitch and locks the liquid in the cylinder 19 to hold the hitch in the raised position. Fig. 1 shows the parts in this position but as illustrated there is no load on the hitch links so that the control spring 30 is in its neutral position in which there is no initial load on the spring. Therefore the spring is ready to act in either direction and its whole range of deflection can be utilized.

Piston 18 is connected by link 29 with crank arm 28 fastened on rock shaft 27 which in turn is attached to the lifting arms 29a. These arms are connected by suitable links 43 with lower links 40 of the Ferguson hitch. These links support an implement such as a cultivator 41, shown in Fig. 7.

The control spring assembly comprises the control spring 30 (Figs. 1, 3 and 5) which has at one end a collar 34 and at the other end a collar 33. These collars are fitted on the control rod 4 and collar 34 is adapted to be contacted by shoulder 34a on the control rod and collar 33 is adapted to be contacted by the adjustable sleeve 5. Hence, any draft load reacting as a compressive force through upper link 1 is communicated to control spring 30 through shoulder 34a and collar 34, as shown in Fig. 3. Any tension on link 1 due to the weight of the implement is communicated to the spring 30 by means of rod 4, nut 5 and collar 33, resulting in a rearward movement due to the deflection of spring 30, as shown in Fig. 5 of the drawings. There is thus, in effect, a two-way connection between the spring 30 and the control rod 4.

In Fig. 3 the parts of the control mechanism are shown in the position they assume when the hitch is down and the implement is working at substantial depth in the ground and with soil that will put substantial draft load upon the implement. Here the control spring 30 is shown compressed forwardly by the forces coming forward through the upper link 1. If the draft load becomes excessive due to the too deep penetration of the implement into the ground, this causes the control rod 4 to move forward from the position shown in Fig. 3, causing the pivots 17 to move forward. The lever fulcrums about the eccentric pin 23 urged by spring 37 and swings clockwise, uncovering inlet port 31 and thereby allowing more liquid to have access to the pump 26, Fig. 1, which thereupon pumps the liquid into the lifting cylinder 19 and causes the piston 18 to be pushed outwardly a sufficient distance to raise the implement to the correct depth. If the draft or horizontal resistance on the implement is less than the setting of the hand lever prescribes, then the pressure on the spring 30 is relieved and the control rod 4 moves outwardly and spring 35 causes the pivot 17 to follow the rod against the pull of spring 37 causing the lever 14 to fulcrum on the eccentric pin 23 and move counterclockwise. This draws the valve 24 rearwardly and uncovers the exhaust port 25. This releases some of the liquid from the lifting cylinder 19, piston 18 moves inwardly, and the crank arm 29ª lowers the hitch and the implement to the correct depth.

When the draft load is so light that a force in tension is present in the upper link 1, the sleeve 5 sliding in the guide cylinder 8 (adjustable spring abutment) bears against the flanged collar 33 to load the control spring 30 from opposite direction (Fig. 5). Consequently, in this condition the control spring 30 assists the draft load in balancing the overhanging implement weight. As the draft varies the tension will vary, but inversely. Thus, if the draft increases, the load in tension on the upper link resisted by the spring will decrease permitting the spring to extend causing a forward movement in the rod 4. Such movement acts on the valve 24 to admit fluid to the system raising the implement to its proper depth. Conversely, a decrease in draft will result in an increase in the load in tension on the upper link resisted by the spring causing a rearward movement in the rod 4 thereby shifting the valve 24 to release some fluid from the system lowering the implement to its proper depth.

This compressed condition of the control spring is shown at the right-hand end of the spring in Fig. 3. Note the position of the crank pin and the lever 14 shown in full lines in Fig. 4 with respect to the position of the eccentric pin and the lever in elevated position in dotted lines in Fig. 4. The clearance between the pin and lever permits the lever to have some movement without shifting the valve when the forces in tension vary while the implement is raised. The full line position of the parts shows the relationship when the hand lever 21 is set for a considerable depth of cut, or in other words when the system is set to respond to forces in compression on the upper link. In Fig. 6 there has been very little movement of the eccentric pin 23 because there has been a movement of the hand lever only a short distance on the segment—the system is set to respond to variations of a light load on the implement acting in tension through the upper link. The compressed condition of the control spring under normal operation at this shallow depth is shown at the left-hand end of the spring in Fig. 5.

We claim:

1. In an automatic depth control for ground-working implements of the type in which a link and control rod are moved by forces resulting from an implement working in the ground to operate mechanism to control the depth of the implement in the ground, a spring for resisting said forces, means for making said spring effective to resist said forces coming through the said link and rod and also effective to resist tension forces applied to said link and rod when the forces are insufficient to overcome the moment of the implement due to its weight and leverage, said means comprising a member on the control rod for applying a forward movement of the control rod to the spring, a second member for applying rearward movement of the control rod to the spring, and spring supports at each end of the spring for holding the spring while the movement is applied by one of said members to the opposite end of the spring.

2. In an automatic depth control for ground-working implements of the type in which a link and control rod are moved by forces resulting from an implement working in the ground to operate mechanism to control the depth of the implement in the ground and a spring is used to yieldingly resist said forces and effect such depth control, means for making said spring effective to resist compression stresses due to said forces coming through the said link and also effective to resist tension forces applied to said link when the said forces are insufficient to overcome the moment of the implement due to its weight and leverage, said means comprising a member on the control rod for applying the forward movement of the control rod to the spring, a second member near the other end of the control rod for applying a rearward movement of the control rod to the spring, and spring supports at each end of the spring for holding the spring while the movement is applied by one of said members to the opposite end of the spring, the said second member being in the form of a nut adjustable along the control rod.

3. In an automatic depth control for ground-working implements of the type in which a link and control rod are moved by forces resulting from an implement working in the ground to operate mechanism to control the depth of the implement in the ground, and a spring is used to yieldingly resist said forces and effect such depth control, means for making said spring effective to resist the compression forces applied to said link and also effective to resist tension forces applied to said link when the reaction forces are insufficient to overcome the moment of the implement due to its weight and leverage, said means comprising a member on the control rod for applying a forward thrust of the control rod to the spring, a second member near the forward end of the control rod for applying a rearward movement of the rod to the spring, spring abutments at each end of the spring for holding the spring while the thrust is applied by one of said members to the opposite end of the spring, and flanged collars one at each end of the spring between the one said member and the end of the spring.

4. In an automatic depth control for ground-working implements of the type in which a link and control rod are moved by forces resulting from an implement working in the ground to operate mechanism to control the depth of the implement in the ground and a spring is used to resist said forces and effect such depth control, means for making said spring effective to resist the said compression stresses due to said forces coming through the said link and also effective to resist tension forces applied to said link when the said forces are insufficient to overcome the moment of the implement due to its weight and leverage, said means comprising a member on the control rod for applying a forward thrust of the control rod to the spring, a second member near the forward end of the control rod for applying tension on the control rod to the forward end of the spring and spring abutments at each end of the spring for holding the spring while the thrust is applied by one of said members to the opposite end of the spring, one of said abutments being adjustable in the direction of the axis of the control rod.

5. In an automatic depth control for ground-working implements of the type in which a link and control rod are moved by forces resulting from an implement working in the ground to operate mechanism to control the depth of the implement in the ground and a spring is used to resist said forces and effect such depth control, means for making said spring effective to resist forces coming through the said link in either longitudinal direction, said means comprising a member on the control rod for applying a thrust of the control rod to the spring in one direction, a second member for applying a thrust of the control rod to the spring in the opposite direction, spring abutments at each end of the spring for holding the spring while the thrust is applied by one of said members to the opposite end of the spring, one of said abutments being in the form of a cylinder threadedly mounted for axial adjustment, and means for locking the said cylinder in its adjusted position.

6. In a control apparatus for soil working implements which is operative to maintain the implement in substantially a predetermined working condition with respect to the soil, the combination of force responsive means adapted to be subjected to the forces acting on the implement and movable thereby in opposite directions in response to forces transmitted respectively in compression or in tension as such forces are produced by a working condition of the implement, force resisting means acting on the movable means to yieldingly oppose movement thereof by either force and having a neutral unloaded condition when neither force is exerted on the movable means, control mechanism for maintaining the implement in a desired relationship to the soil as determined by the forces produced by the working condition of the implement at that relationship, and means for actuating said control mechanism by the response of said movable means to either force.

7. For use with tractor borne automatic depth control apparatus for ground-working implements of the type in which bodily shift of a reversely movable control member from an intermediate mean position in its path of travel by force derived from ground reaction of the implement is utilized to control a power actuated lift device, the combination comprising restoring means including a resilient member for mounting on said tractor for association with said control member, said resilient member being of the type in which displacement thereof is accompanied by a progressively increasing restoring force, connector means interconnecting said restoring means and said control member, said connector means being so constructed and arranged that movement of the control member in either direction from the intermediate mean position in its path of travel causes stressing of said restoring means and application of a progressively increased yielding resistance to the movement of said control member.

8. For use in an automatic depth control for ground-working implements of the type in which a reversely movable control member is subjected to stress in one direction by the overhanging weight of the implement when the latter is elevated and which stress gradually diminishes and finally changes to a progressively increasing stress in the opposite direction as the implement is lowered and ground reaction force on the same is progressively increased, the combination with a spring, of means interconnecting said spring with said control member and with an adjacent fixed abutment for stressing said spring upon movement of said control member in either direction away from an intermediate mean point in its path of travel.

9. For use in an automatic depth control for ground-working implements of the type in which a control rod is slidable endwise and subjected to axial stress in one direction by overhanging weight of the implement when the latter is elevated and which stress gradually diminishes and finally changes to a progressively increasing stress in the opposite direction as the implement is lowered and ground reaction force on the same is progressively increased, the combination with a helical spring diminished to encircle said rod in spaced relation thereto, of means interconnecting said spring with said rod and with an adjacent fixed abutment for stressing said spring by any movement of said rod away from an intermediate mean position in its path of travel.

10. The combination, in a depth control for soil working implements, of power means for varying the operating relationship of an implement in the soil through its complete range of soil engagement, a control member for governing the operation of said power means, supporting means for said control member permitting movement thereof in opposite directions, resiliently yieldable means having a two-way connection with said control member to resist movement thereof in opposite directions from an intermediate static position, and means for connecting said control member with an implement to effect movement of said member in one direction or the other according to the predominating force acting on the implement.

JOHN M. CHAMBERS.
ERNEST V. BUNTING.

REFERENCES CITED

The following references are of record in the file of this patent:

UNITED STATES PATENTS

| Number | Name | Date |
| --- | --- | --- |
| 2,118,180 | Ferguson | May 24, 1938 |
| 2,356,231 | Ferguson | Aug. 22, 1944 |
| 2,414,114 | Martin | Jan. 14, 1947 |